T. J. KING.
WEEDING OR CHOPPING HOE.
APPLICATION FILED AUG. 19, 1909.
945,399.
Patented Jan. 4, 1910.
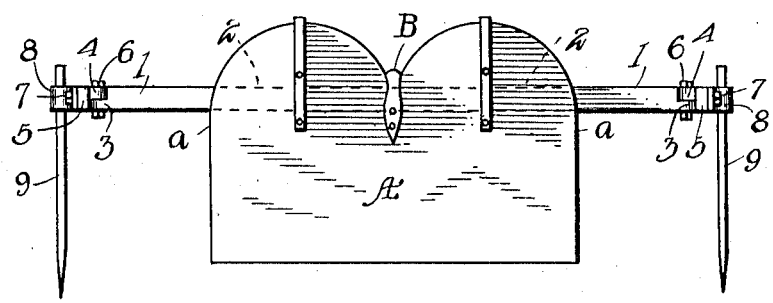
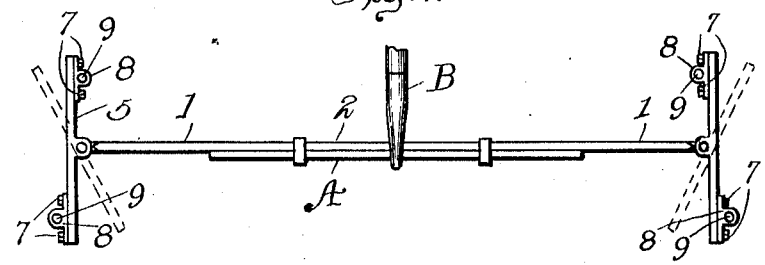
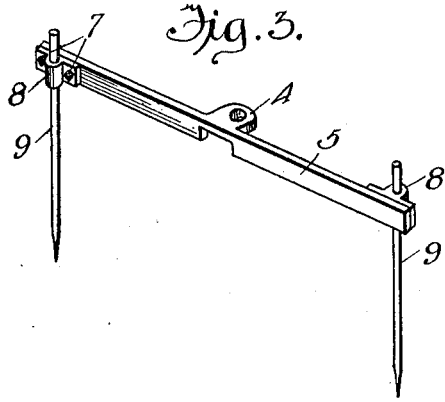
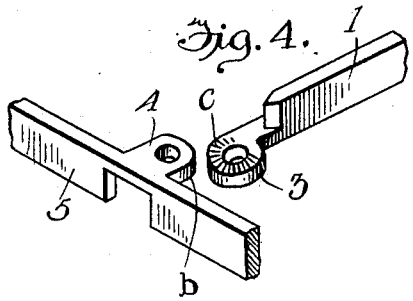
WITNESSES
G. M. Spring.
A. B. Clarke.
INVENTOR
Thomas J. King
by David P. Moore
Attorney

UNITED STATES PATENT OFFICE.

THOMAS JOEL KING, OF RICHMOND, VIRGINIA.

WEEDING OR CHOPPING HOE.

945,399.  Specification of Letters Patent.  Patented Jan. 4, 1910.

Application filed August 19, 1909. Serial No. 513,665.

*To all whom it may concern:*

Be it known that I, THOMAS JOEL KING, a citizen of the United States, residing at Richmond, in the county of Henrico and State of Virginia, have invented certain new and useful Improvements in Weeding or Chopping Hoes, of which the following is a specification, reference being had therein to the accompanying drawing.

This invention relates to improvements in weeding or chopping hoes, this particular hoe, being designed to obtain better results than can be obtained by my hoe as set forth in my Patent No. 932,872 granted to me August 31st, 1909.

The sole object of this improvement is to make it easy to change the distance apart of the weeder teeth, this being very important, as varying distances will be necessary in cultivating large and small plants.

Another advantage of the present arrangement, is that the weeder teeth follow one behind the other and weed one plant off with the edge of the hoe. By this means, the weeder tooth removes the tendency to collect trash, to tear up blocks of earth, and by this means the device will leave a better cultivated surface.

To clearly illustrate the present invention, attention is invited to the accompanying drawings, in which:—

Figure 1 is an end view of a hoe with the device attached. Fig. 2 is a top plan view thereof. Fig. 3 is a detail view of one of the adjustable weeder arms detached, and Fig. 4 is a detail view of the adjustable connection between the arm and support.

Referring to the drawings:—A designates the hoe proper, provided with the handle or helve attaching eye or plate B. Upon the inner face of the blade, or so that it will extend longitudinally of the blade and have its ends 1, project beyond the sides $a$ of the hoe blade, is the support or frame 2. This support or frame may be attached by any desired means, and has each end provided with one member 3, which with the other member 4, carried by each weeder arm 5, constitutes a hinge or pivotal joint, between the end of the frame and the weeder arm, the bolt or rod 6, securing the members 3 and 4 together.

In order to lock the weeder arm in any adjusted position or angle, the opposed faces $b$ and $c$, of the members 3 and 4, respectively are serrated or roughened, so that when the bolt or rod 6, is clamped, the faces $b$ and $c$ are forced together and thus held locked by the bolt. By this means it will be seen that each frame carries one weeder arm at each end, and that said arms may be adjusted and held at any desired angle.

Vertically adjustably secured by means of screws or bolts 7, and clamping plates 8 to the arms 5, are the weeding or chopping teeth 9, which are preferably arranged two to each weeder arm, one near each end, and as illustrated in Fig. 2, it is evident that these teeth may cultivate at different angles.

What I claim, as new is:—

1. In combination with a hoe blade, of a frame carried thereby and having its ends projecting beyond the outer edges of the blade, weeder arms adjustably secured to the projecting ends of the frame, and teeth carried in said weeder arms.

2. In combination with a hoe blade, of a frame carried thereby and projecting beyond the outer edge of the blade, a weeder arm adjustably secured to said projecting end of the frame, and teeth carried in said weeder arm.

3. In combination with a hoe blade, of a frame carried thereby and projecting beyond the outer edge of the blade, a weeder arm adjustably secured to said projecting end of the frame, and teeth adjustably carried in said arm.

4. In combination with a hoe blade, of a frame carried thereby and having its ends projecting beyond the outer edges of the blade, a weeder arm adjustably secured to each of said projecting ends, and teeth adjustably carried by said weeder arms.

5. In combination with a hoe blade, of a frame carried thereby and having its ends projecting beyond the outer edge of the blade, a weeder arm hingedly and adjustably secured to the outer ends of said frame, and teeth carried by each weeder arm.

6. In combination with a hoe blade, of a frame carried thereby and having its ends projecting beyond the outer edge of the blade, a weeder arm hingedly and adjustably secured to the outer ends of said frame, and teeth adjustably carried by each weeder arm.

7. In combination with a hoe blade, of a frame carried thereby and having its ends projecting beyond the outer edges of the blade, a weeder arm hingedly secured to the said ends and adapted to swing horizontally to the cutting edge of the blade, and teeth carried by each weeder arm and adapted to project in the same direction as the cutting edge of the blade.

8. In combination with a hoe blade, of a frame carried thereby and having its ends projecting beyond the outer edges of the blade, two weeder arms, a locking hinged joint between the ends of the frame and the body of the weeder arms, and teeth carried by each arm.

9. In combination with a hoe blade, of a frame carried thereby and having its ends projecting beyond the outer edges of the blade, two weeder arms, a locking hinged joint between the ends of the frame and the body of the weeder arms, and teeth adjustably carried by each arm.

10. In combination with a hoe blade, of a frame so carried thereby as to project beyond the outer edge of the blade, a weeder arm, a locking hinged joint between the projecting end of the frame and the body of the weeder arm, and teeth carried by said arm.

In testimony whereof I affix my signature in presence of two witnesses.

THOMAS JOEL KING.

Witnesses:
A. L. HAWSE,
R. S. FRIEND.